Oct. 26, 1954  J. M. WOLF  2,692,971
STANDING WAVE RATIO MEASURING DEVICE
Filed April 3, 1946
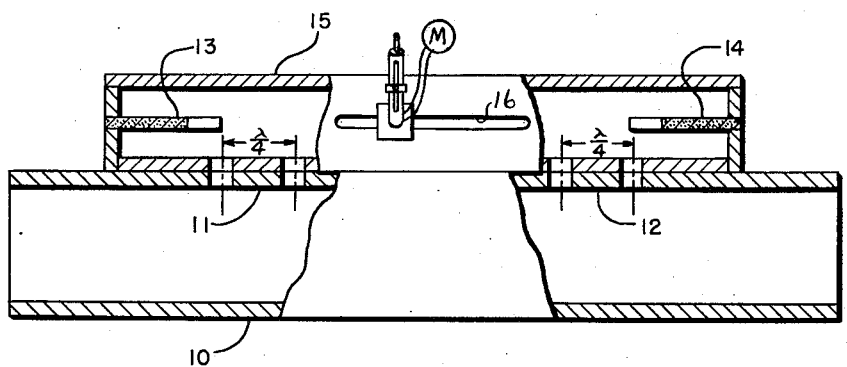
INVENTOR
JAMES M. WOLF
BY
ATTORNEY Patented Oct. 26, 1954

2,692,971

UNITED STATES PATENT OFFICE 2,692,971

STANDING WAVE RATIO MEASURING DEVICE

James M. Wolf, Rochester, N. Y., assignor, by mesne assignments, to the United States of America as represented by the Secretary of the Navy Application April 3, 1946, Serial No. 659,182

6 Claims. (Cl. 324—58)

The present invention relates to the measurement of standing wave ratios in transmission line. More particularly it relates to a device which enables amplification or de-amplification of the standing wave ratio by the use of two directional couplers.

In the measurement of standing wave ratios difficulty has been encountered in the measurement of very large ratios and of ratios very close to unity. It would be desirable to cause these ratios to fall within the range of ordinary detecting apparatus.

Accordingly, it is an object of this invention to provide suitable means for measuring standing wave ratios.

Another object of this invention is to provide suitable means for measuring with usual detecting apparatus very large standing wave ratios and ratios which are very close to unity.

Other and further objects will be more readily evident upon examination of the following discussion and the accompanying drawing, which discloses one embodiment of this invention.

The basic philosophy of the invention is an alteration to the relative magnitudes of the incident and reflected waves in such fashion that subsequent recombination will result in a standing wave ratio which will fall within the range of ordinary detecting apparatus. In this embodiment two directional couplers are employed. One directional coupler selects the incident wave, the other the reflected wave. The two directional couplers couple different percentages of the respective energies which are available to each in the transmission line and thereby change the relative magnitudes of the incident and reflected waves. For example, the first coupler may abstract five percent of the incident wave whereas the second coupler may abstract two percent of the reflected wave. Upon recombination it is evident that this unequal percentage coupling will result in an altered standing wave ratio. Thus lines in which standing wave ratios are known to be high may have directional couplers so arranged that a smaller percentage of the reflected wave is coupled than of the incident wave, thus reducing the standing wave ratio. Similarly, for standing wave ratios approaching unity the directional couplers may be so arranged that a smaller percentage of the incident wave may be coupled than of the reflected wave in order that the incident wave, as seen in recombination for detection, will more closely approach the magnitude of the reflected wave, thereby effecting a larger, and consequently more easily measured, standing wave ratio in the region of recombination. With knowledge of the percentage coupling of each directional coupling, the standing wave ratio detecting apparatus may be readily calibrated for direct reading of large or small standing wave ratios while still employing sensitive elements in the detecting apparatus.

Understanding of this embodiment will be furthered by reference to the drawing. Wave guide transmission line 10 is disclosed together with two directive devices 11 and 12. Each of the directive devices has an appropriate termination consisting of loads 13 and 14 respectively spaced at opposite ends of wave guide 15. Loads 13 and 14 may be suitable colloidal graphite suspensions or any other absorbent material suitable for wave guide termination. Each directive device with its associated termination forms a directional coupler. The energies from each of the two directional couplers are fed to the respective end of slotted section 16 of wave guide 15 incorporating both directional couplers. For description of the operation of this embodiment the incident wave will be assumed to be traveling from left to right and the reflected wave from right to left in wave guide 10. For simplicity directional device 11 will henceforth be referred to as directional coupler 11 and similarly directive device 12 as directional coupler 12. The distance between the two holes of each directional coupler is a quarter wave length and is indicated on the drawing as $\lambda/4$. Thus the incident wave, proceeding from left to right will enter directional coupler 11 and a given percentage will proceed to slotted section 16. When the incident wave reaches directional coupler 12, it may enter and proceed to terminating load 14, which will completely absorb it, but the incident wave cannot enter slotted section 16 from directional coupler 12 due to the fact that the energy which enters the left hole of directional coupler 12 will be cancelled by the energy entering the right hole since this latter energy traverses a path which is one half wave length longer than that of the former energy. Directional coupler 11 may therefore be considered the incident wave coupler. By similar reasoning directional coupler 12 introduces a percentage of the reflected wave into slotted section 16. The percentage coupling of a directional coupler may be varied in several well known ways, for example, by varying the size of the coupling holes or by varying the position of these coupling holes on the wall of the waveguide. Therefore, in the embodiment of the invention shown in the drawing, directional coupler 11 may be constructed to have a coupling coefficient different from that of coupler 12. If the standing wave ratio to be measured is known to lie within a certain range of values a single measuring device having a preselected amplification or attenuation factor may be permanently connected into the waveguide system. However, if the standing wave ratio is known to vary widely it may be more convenient to provide several measuring devices each having a different known attenuation or amplification factor and each mounted on a separate section of waveguide that may be rapidly and easily inserted into the waveguide system. In this connection it should be noted that the measuring device of the present invention is reversible, that is, if the section of waveguide carrying the measuring device is changed end for end, the measuring device which previously amplified the standing wave ratio will now attenuate this ratio.

An alternative arrangement would be to employ a single measuring device in which one or both of the directional couplers might be so constructed that the percentage coupling is variable. This might be accomplished by employing well known techniques for changing the size of the coupling holes or for varying the position of these holes on the wall of the waveguide. Thus means have been disclosed which enable measurement of large standing wave ratios and ratios closely approaching unity by use of ordinary detecting apparatus. The ordinary detecting apparatus generally consists of a probe extending through the slot of slotted section 16 to extract electric energy which is then fed to a crystal or other suitable detector. The detected energy is passed to a microammeter for amplitude measurement. The probe is moved along slotted section 16 and readings taken at maximum and minimum points. The ratio of the maximum reading to the minimum reading is the standing wave ratio.

While the foregoing description has presented an explanation of this invention in the particular application of a device for amplification and de-amplification of standing wave ratios, the principles of this invention are of broader application in ways which will be apparent to those versed in the art. Accordingly, it will be understood that the above-disclosed embodiment is primarily illustrative and that the invention includes such other embodiments as fairly fall within the spirit and scope of the appended claims.

What is claimed is:

1. A radio frequency structure comprising, first and second waveguide transmission lines, each adapted to carry energy having a given wavelength, and each having at least one longitudinal wall, said second waveguide transmission line further having first and second closed ends, said second waveguide being formed with a central longitudinally disposed slot, said first and second waveguides being disposed in juxtaposition at their longitudinal walls, said first and second waveguides each being formed at their longitudinal walls with a first pair of holes common to said juxtaposed longitudinal walls at the first closed end of said second waveguide and with a second pair of holes common to said juxtaposed longitudinal walls at the second closed end of said second waveguide, said holes of each of said first and second pairs being spaced apart by one quarter of said given wave length, first and second terminating loads disposed respectively at said first and second closed ends of said second wave guide for absorbing any of said energy reaching said first and second closed ends, said first pair of holes and said first terminating load constituting a first directional coupler having a first coupling coefficient for coupling into said second waveguide a predetermined percentage of any wave energy at said given wave length transmitted in said first waveguide in a first direction, said second pair of holes and said second terminating load constituting a second directional coupler having a second coupling coefficient for coupling into said second waveguide a predetermined percentage of any energy at said given wave length transmitted in said first waveguide in a second direction opposite to said first direction, said first coupling coefficient and said second coupling coefficient being of different values whereby the standing wave ratio in said second waveguide in the region of said slot is a function of the energy traveling in said first and said second directions in said first waveguide and the percentages of coupling of said first and second directional couplers.

2. A radio frequency transmission line structure comprising, a first wave guide transmission line, a second wave guide transmission line terminated at each end in a reflectionless manner and juxtaposed longitudinally with respect to said first wave guide, said second wave guide being formed with a central longitudinally disposed slot, a first directional coupler disposed at one end of said second wave guide for coupling into said second wave guide a predetermined percentage of the incident wave propagated in said first wave guide, and a second directional coupler disposed at the other end of said second wave guide for coupling into said second wave guide a predetermined percentage of the reflected wave propagated in said first wave guide, said percentages having unequal values enabling the amplification or de-amplification by said structure of the standing wave ratio of said first wave guide transmission line and the determination of said standing wave ratio by consideration of said given percentages and measurement of the standing wave ratio established in said second wave guide by the incident and reflected waves coupled thereto.

3. A radio frequency transmission line structure comprising, a first wave guide transmission line, a second wave guide transmission line closed at each end and juxtaposed longitudinally with respect to said first wave guide, said second wave guide being formed with a central, longitudinally disposed, slot, a first two-hole directional coupler having its two holes one quarter wave length apart and disposed at one end of said second wave guide for coupling into said second wave guide a predetermined percentage of the incident wave of said first wave guide, and a second two-hole directional coupler having its two holes one quarter wave length apart and disposed at the other end of said second wave guide for coupling into said second wave guide a predetermined percentage of the reflected wave of said first wave guide, said percentages having different values enabling the amplification or de-amplification by said structure of the standing wave ratio of said first wave guide, and the determination of said standing wave ratio by consideration of said percentages and measurement of the standing wave ratio established in said slotted wave guide by said percentages of incident and reflected waves coupled thereto.

4. Apparatus for determining the standing wave ratio established in a first rectangular wave guide by incident and reflected waves propagated therein comprising, a short section of auxiliary rectangular wave guide terminated at each end in a reflectionless manner and placed contiguously along the side of said first wave guide, a first directional coupler disposed at one end of said auxiliary wave guide and arranged to couple a predetermined percentage of the incident waves from said first wave guide to propagate waves toward the other end of said auxiliary wave guide, a second directional coupler disposed at the other end of said auxiliary wave guide and arranged to couple a predetermined percentage of the reflected waves in said first wave guide to propagate waves toward said one end of said auxiliary wave guide, said first and second percentages being of unequal values whereby standing waves having a standing wave ratio proportional to the standing wave ratio in said first guide modified by the relative percentage of coupling of said first and second directional couplers are established in said auxiliary wave guide, the unequal coupling of said first and second couplers enabling the amplification or de-amplification of the standing wave ratio established in said first wave guide to establish a measurable standing wave ratio in said auxiliary wave guide.

5. A radio frequency transmission line structure comprising, a transmission line, a first directional coupler having a first coupling coefficient for extracting from said transmission line a desired percentage of the incident wave energy carried by said line, a second directional coupler having a second coupling coefficient for extracting from said transmission line a desired percentage of the reflected wave energy carried by said transmission line, said first and second coupling coefficients being of unequal values, and means for carrying said extracted incident and reflected wave energies in opposite directions over a common path.

6. A radio frequency transmission line structure comprising, a first transmission line, a first directional coupler having a first coupling coefficient for extracting from said transmission line a percentage of any incident wave energy carried by said line, a second directional coupler having a second coupling coefficient for extracting from said transmission line a percentage of any reflected wave energy carried by said transmission line, said first and said second coupling coefficients being of unequal magnitudes, a second transmission line disposed between said directional couplers for carrying said extracted incident and reflected wave energies in opposite directions whereby standing waves having a standing wave ratio proportional to the standing wave ratio in said first transmission line and said coupling coefficients are established in said second transmission line and means associated with said second transmission line for determining the standing wave ratio of the standing waves so established.

References Cited in the file of this patent
UNITED STATES PATENTS

| Number | Name | Date |
|---|---|---|
| 2,129,669 | Bowen | Sept. 13, 1938 |
| 2,419,208 | Frantz et al. | Apr. 22, 1947 |
| 2,423,390 | Korman | July 1, 1947 |
| 2,423,526 | Sontheimer et al. | July 8, 1947 |
| 2,442,606 | Korman | June 1, 1948 |
| 2,479,650 | Tiley | Aug. 23, 1949 |
| 2,549,385 | Rapuano | Apr. 17, 1951 |
| 2,562,281 | Mumford | July 31, 1951 |
| 2,566,020 | Fenn | Aug. 28, 1951 |